(12) United States Patent
Klein et al.

(10) Patent No.: US 9,574,089 B2
(45) Date of Patent: Feb. 21, 2017

(54) FLUORINE-CONTAINING NONAQUEOUS COATING MATERIAL COMPOSITION, COATING METHODS, AND THE USE OF THE COATING MATERIAL COMPOSITION

(71) Applicant: BASF Coatings GmbH, Münster (DE)

(72) Inventors: Günter Klein, Münster (DE); Peter Hoffmann, Senden (DE); Andreas Feigl, Münster (DE); Fabian Niedermair, Trostberg (DE); Norbert Steidl, Kienberg (DE); Burkhard Walther, Garching (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 14/432,609

(22) PCT Filed: Aug. 16, 2013

(86) PCT No.: PCT/EP2013/067151
§ 371 (c)(1),
(2) Date: Mar. 31, 2015

(87) PCT Pub. No.: WO2014/053268
PCT Pub. Date: Apr. 10, 2014

(65) Prior Publication Data
US 2015/0240085 A1    Aug. 27, 2015

Related U.S. Application Data

(60) Provisional application No. 61/709,548, filed on Oct. 4, 2012.

(30) Foreign Application Priority Data

Oct. 4, 2012 (EP) .................... 12187210

(51) Int. Cl.
| | |
|---|---|
| *C09D 4/00* | (2006.01) |
| *C08G 18/62* | (2006.01) |
| *C08G 18/67* | (2006.01) |
| *C08G 18/75* | (2006.01) |
| *C08G 18/79* | (2006.01) |
| *C09D 133/16* | (2006.01) |
| *C09D 175/04* | (2006.01) |
| *C08G 18/28* | (2006.01) |
| *F03D 1/06* | (2006.01) |
| *F01D 5/28* | (2006.01) |

(52) U.S. Cl.
CPC .............. *C09D 4/00* (2013.01); *C08G 18/2885* (2013.01); *C08G 18/6279* (2013.01); *C08G 18/672* (2013.01); *C08G 18/6725* (2013.01); *C08G 18/755* (2013.01); *C08G 18/792* (2013.01); *C09D 133/16* (2013.01); *C09D 175/04* (2013.01); *F01D 5/282* (2013.01); *F03D 1/06* (2013.01); *C08L 2201/56* (2013.01); *Y02E 10/721* (2013.01)

(58) Field of Classification Search
CPC ............ C08G 18/6279; C08G 18/2885; C09D 127/12; C09D 133/16; C09D 175/04
See application file for complete search history.

(56) References Cited

U.S. PATENT DOCUMENTS

| | | | |
|---|---|---|---|
| 4,598,131 A | 7/1986 | Prucnal | |
| 4,939,213 A | 7/1990 | Jacobs, III et al. | |
| 5,084,541 A | 1/1992 | Jacobs, III et al. | |
| 5,629,372 A * | 5/1997 | Anton ................ | C08G 18/6279 524/507 |
| 5,644,014 A | 7/1997 | Schmidt et al. | |
| 5,716,678 A | 2/1998 | Rockrath et al. | |
| 6,403,699 B1 | 6/2002 | Rockrath et al. | |
| 6,660,363 B1 | 12/2003 | Barthlott | |
| 6,729,846 B1 | 5/2004 | Wobben | |
| 7,265,178 B2 | 9/2007 | Maier et al. | |
| 2003/0027921 A1 | 2/2003 | Speier et al. | |
| 2005/0182189 A1 | 8/2005 | Ohrbom et al. | |
| 2006/0167206 A1* | 7/2006 | Maier ................ | C08G 18/2885 528/44 |
| 2008/0008838 A1 | 1/2008 | Arpac et al. | |
| 2009/0198000 A1 | 8/2009 | Weinelt et al. | |
| 2009/0240004 A1 | 9/2009 | Maier et al. | |
| 2010/0285311 A1 | 11/2010 | Steidl et al. | |

FOREIGN PATENT DOCUMENTS

| | | |
|---|---|---|
| CN | 101020731 | 8/2007 |
| CN | 101024743 | 8/2007 |

(Continued)

OTHER PUBLICATIONS

Saidi, Salima, Flourinated Comblike Homopolymers: The Effect of Spacer Lengths on Surface Properties, *Journal of Polymer Science: Part A: Chemistry*, vol. 43 2005, 3737-3747.
CN20071090028, Database WPI, Week 200825, Thomson Scientific, London, GB; AN 2008-D28323, XP002714922 2007, 1 page.
Lacke und Druckfarben, Georg Thieme Verlag, Stuttgart 1998, 250-252.
Zhong-Hua, Li, et. al, Preparation of a Novel Fluorinated Polyacrylate and Its Application on Cotton Fabrics, *Journal of Donghua University (Natural Science)*, vol. 35, No. 5, Oct. 2009, pp. 547-553.

(Continued)

*Primary Examiner* — Wenwen Cai
(74) *Attorney, Agent, or Firm* — Servilla Whitney LLC

(57) ABSTRACT

Nonaqueous coating material compositions comprising at least one polyhydroxyl and (per)fluoroalkyl group-containing poly(meth)acrylate component (A), at least one polyisocyanate group-containing compounds (B), and one or more catalysts (D). Also provided are multistage coating methods using the coating material compositions, and also the use of the coating material compositions as a clearcoat material and for coating of wind energy systems or aircraft, or parts thereof, more particularly as an anti-icing coating.

21 Claims, No Drawings

(56) References Cited

FOREIGN PATENT DOCUMENTS

| | | |
|---|---|---|
| DE | 102008010464 | 8/2009 |
| EP | 0008127 | 2/1980 |
| EP | 0249201 | 12/1987 |
| EP | 0587667 | 3/1994 |
| EP | 0624577 | 11/1994 |
| EP | 0692007 | 1/1996 |
| EP | 0276501 | 8/1998 |
| EP | 0856020 | 8/1998 |
| EP | 0856022 | 8/1998 |
| EP | 0994117 | 4/2000 |
| EP | 1141543 | 10/2001 |
| EP | 1210396 | 6/2002 |
| EP | 1273640 | 1/2003 |
| EP | 1664222 | 6/2006 |
| EP | 1844863 | 10/2007 |
| EP | 2085442 | 8/2009 |
| WO | WO-92/21729 | 12/1992 |
| WO | WO-94/22968 | 10/1994 |
| WO | WO-96/04123 | 2/1996 |
| WO | WO-97/12945 | 4/1997 |
| WO | WO-97/14732 | 4/1997 |
| WO | WO-97/14735 | 4/1997 |
| WO | WO-00/34651 | 6/2000 |
| WO | WO-01/09260 | 2/2001 |
| WO | WO-2001/114497 | 3/2001 |
| WO | WO-2005/007762 | 1/2005 |
| WO | WO-2005/030891 | 4/2005 |
| WO | WO-2005/030892 | 4/2005 |
| WO | WO-2005/080465 | 9/2005 |
| WO | WO-2007/115752 | 10/2007 |
| WO | WO-2008/040428 | 4/2008 |
| WO | WO-2011/020876 | 2/2011 |
| WO | WO-2011/141716 | 11/2011 |

OTHER PUBLICATIONS

PCT International Preliminary Report on Patentability in PCT/EP2013/067151, dated Apr. 16, 2015, 7 pages.
PCT International Written Opinion in PCT/EP2013/067151, dated Oct. 28, 2013, 5 pages.
PCT International Search Report in PCT/EP2013/067151, mailed Oct. 28, 2013, 3 pages.

* cited by examiner

FLUORINE-CONTAINING NONAQUEOUS COATING MATERIAL COMPOSITION, COATING METHODS, AND THE USE OF THE COATING MATERIAL COMPOSITION

CROSS-REFERENCE TO RELATED APPLICATIONS

This application is the National Stage entry of PCT/EP2013/067151, filed on Aug. 16, 2013, which claims priority to European Application Number 12187210.5, filed on Oct. 4, 2012, and U.S. Ser. No. 61/709,548 filed on Oct. 4, 2012, which are incorporated herein by reference in their entireties.

TECHNICAL FIELD

The present invention relates to nonaqueous coating material compositions comprising at least one polyhydroxyl and (per)fluoroalkyl group-containing poly(meth)acrylate component (A), at least one polyisocyanate group-containing compound (B), and a catalyst (D).

The present invention further provides coating methods using these coating material compositions, and also the use of the coating material compositions as clearcoat material and for the coating of wind energy systems or aircraft, or parts thereof, more particularly as an anti-icing coating.

BACKGROUND

Nonaqueous coating materials based on fluorine-containing polymers are well established for a large number of very different end-use applications.

Thus, for example, EP-B-856 020 describes nonaqueous clearcoat materials based on fluorine-containing polyacrylate binders and on polyisocyanate group-containing crosslinking agents, these coating materials being curable to oil-, soiling-, and water-repellent coatings and being useful for the coating of vehicles, such as subway cars, trains, buses, and the like, industrial systems, such as tanks, buildings, and other edifices, for example. The clearcoat materials serve more particularly for the coating of buildings, buses, trains and other objects where graffiti is a problem, since the resultant coatings are easily cleaned and also offer high resistance toward soiling. To prepare the fluorine-containing polyacrylate binders, ethylenically unsaturated compounds are used that have fluoroalkyl groups, such as fluoroalkylethyl (meth)acrylates or 2-(N-ethylperfluorooctanesulfoamido)ethyl methacrylate, for example. These fluorine-containing monomers, though, have to be added on their own and separately from the remaining monomers, and this makes the binders decidedly costly and inconvenient to prepare.

Moreover, information as to how it is possible to obtain surfaces which have a high hydrophobicity which is as long-term as possible and which at the same time have a very high mechanical and photochemical stability, such surfaces being required, for example, for the coating of rotor blades for wind energy systems, is no more present in that specification than is information as to how to ensure extremely rapid assembly strength and good repair adhesion. Nor is there any information as to how these qualities can be achieved in as simple and inexpensive a way as possible.

Furthermore, EP-B-856 022 discloses similar coating materials which as well as fluorine-containing polyacrylate binders comprise polyisocyanate crosslinkers in which 0.1 to 33 mol % of the isocyanate groups have been reacted with perfluoroalcohols. In the preparation—described therein—of the fluorinated polyisocyanates, high fractions of difluorinated and trifluorinated polyisocyanates are expected as well as monofluorinated polyisocyanates, and the di- and trifluorinated polyisocyanates may migrate to the film surface and hence adversely affect the overall visual appearance, the hardness, the chemicals resistance, and other mechano-technological properties of the resultant coating.

Fluorine-containing clearcoat materials are also described in WO05/030892, the binders in these clearcoat materials being fluorine-containing polyacrylates which also contain organosilane monomers in copolymerized form. The fluorine-containing polyacrylates are obtained in turn by copolymerization of ethylenically unsaturated compounds having fluoroalkyl groups, such as fluoroalkylethyl (meth)acrylates or 2-(N-ethylperfluorooctanesulfoamido)alkyl (meth)-acrylate, for example.

WO05/030891 discloses fluorinated clearcoat materials having improved clearcoat/clearcoat adhesion, these materials comprising not only a fluorinated silane polymer based on copolymerized ethylenically unsaturated compounds having fluoroalkyl groups, such as fluoroalkylethyl (meth)acrylates or 2-(N-ethylperfluorooctanesulfoamido)alkyl (meth)acrylates, for example, but also a fluorinated polyurethane resin for promoting adhesion. This resin is obtainable by reacting a polyisocyanate with a perfluorinated monoalcohol and with an oligomeric and/or polymeric polyether polyol, such as ethoxylated/propoxylated glycol, and does not contain any remaining free isocyanate groups.

WO05/080465 describes abrasion-resistant and alkali-resistant coatings that are easy to clean and are obtained using coating materials which in addition to a curable binder system and inorganic particles comprise at least one fluorine-containing oligomer or polymer having at least one functional group which is reactive with a functional group of the binder system. The fluorine-containing polymer or oligomer used comprises, for example, fluorinated polyethers, fluorinated epoxides, fluorinated polyurethanes, and fluorine-containing polymers, the fluorine-containing polymers being prepared using commercial fluoromonomers, such as tetrafluoroethylene, vinylidene fluoride, and the like.

WO07/115752 describes two-component aqueous hybrid reactive-resin systems based on polyurethane, with an epoxide/amine curing mechanism, which are used in the construction and industrial sectors for the production of easy-to-clean coatings which feature high mechanical robustness. These coating materials may optionally comprise amino- and/or hydroxy- and/or mercapto-functional, fluorine-modified macromonomers or telechelics.

Furthermore, WO05/007762 describes aqueous, optionally fluorinated polyurethane hybrid dispersions with covalently bonded fluorinated side chains, which can be introduced via the polyurethane basis and/or via radically polymerizable, fluorine-containing monomers. Using these polyurethane hybrid dispersions it is possible, by virtue of the high crosslinking density in conjunction with high hardness, to produce soiling-repellent coatings having good mechanical properties and good solvent resistance and chemicals resistance, these coatings being suitable for a very large number of different end uses.

WO08/040428 as well discloses fluorine-modified polyurethane coatings especially in the construction and industrial sectors for the permanent oil-, water- and soiling-repellent coating of mineral and non-mineral substrates.

Moreover, EP-A-2 085 442 discloses aqueous coating materials which are based on fluorosilane components and are used for the permanent oil-repellent and water-repellent surface treatment of mineral and non-mineral substrates for a variety of end-use applications.

EP-B-587 667 discloses coating material compositions based on fluorine-containing inorganic polycondensates, and used for coating glass, ceramic, metal, plastics, and paper, more particularly for coating exterior and interior mirrors and also windshields of motor vehicles.

EP-A-1 844 863 describes, likewise, coating materials for producing strongly liquid-repellent coatings, in other words coatings which develop a very large contact angle of 120° to 180° with a reference liquid, such as water more particularly. This is done using coating materials which comprise a polymer and a ceramic material or nanoparticles, and which, accordingly, lead to coatings having a textured surface. Details on the more precise composition of the polymers, however, are absent.

For surface coatings, experiments with comb polymers having fluorinated side chains have already been conducted. In this respect it is known that critical factors in achieving a low surface energy and hence good soiling repellency and water repellency properties include very long fluorinated chains and very short spacers to the main chain, in the form of hydrocarbon groups. Longer spacers, in contrast, lead to much poorer results ("Fluorinated comblike homopolymers: The effect of spacer lengths on surface properties", Saïdi, Salima; Guittard, Frédéric; Guimon, Claude; Géribaldi, Serge; Journal of Polymer Science Part A: Polymer Chemistry, Vol. 43, issue 17, pp. 3737-3747).

Disclosed, furthermore, by Journal of Donghua University (Natural Science), Vol. 35, No. 5, October 2009, pages 547-553 is the production of a fluorinated polyacrylate emulsion by copolymerization of the reaction product of perfluorooctanol, isophorone diisocyanate, and hydroxyethyl acrylate with hydroxyethyl acrylate and octadecyl acrylate, and also the use of the resulting fluorinated polyacrylate emulsion for the coating of cotton fibers.

Chinese laid-open specification CN101020731 A, moreover, describes the preparation of fluorinated acrylate copolymers by reaction of a hydroxyl group-containing acrylate copolymer with the isocyanate group-containing equimolar reaction product of a diisocyanate with a perfluoroalkyl alcohol. These solvent-based fluorinated acrylate copolymers are used to impart water and oil repellency to leather, textile products, and the like.

There are also a multiplicity of other specifications disclosing hydrophobic coating materials for the purpose of producing water-repellent coatings. Thus, for example, EP-B-1 210 396 describes hydrophobic coating compositions for producing anti-icing coatings, said coatings being produced by chemical attachment of particles to a gel, preferably a silica-based gel, with the hydrophobicity of the surfaces being increased physically through the roughness of the surfaces.

WO96/04123 likewise describes hydrophobic coating materials for producing self-cleaning surfaces, where an artificial surface texture composed of elevations and depressions is generated, and the elevations consist of hydrophobized materials. Teflon, for example, is used for this purpose.

It is known, moreover, from WO2011/147416, for example, that the surface of wind energy systems or parts thereof, especially the rotor blades, may be provided with a strongly hydrophobic coating in order to lessen the attachment of ice, water, and soiling, since the latter may have the effect, for example, of adversely influencing the weight and aerodynamics of the rotor blades and hence reducing the efficiency of the wind energy system. Coating materials recommended include, for example, Teflon, fluoropolyurethanes, epoxy-fluorinated components, siliconized polyureas, or the like. More detailed information concerning the composition of suitable coating materials is absent from that specification as well.

It is also known from WO2011/020876, furthermore, that the surface of wind energy systems or parts thereof, especially the rotor blades, can be given a strongly hydrophobic coating based on fluorinated polyurethanes, or on polyurethanes in a blend with Teflon—again, however, more detailed information concerning the composition of suitable materials is absent from that specification.

It is known, furthermore, from EP-B-1 141 543 that the rotor blades of wind energy systems can be coated with a liquid-repellent coating material in order thus to reduce the noise emissions of wind energy systems. Examples given of suitable coating materials include not only commercial micro-silicone paints but also polyurethane paints developed for marine coating; again, however, more detailed information concerning the composition of suitable coating materials is absent from that specification.

SUMMARY

Problem

A problem addressed by the present invention, therefore, was that of providing coating material compositions, especially for the coating of wind energy systems or aircraft, or parts thereof, which ensure good adhesion to the respective substrate or to a coating already present on the substrate, and also good recoatability on the part of the resultant coating. At the same time the coating materials ought to lead to coatings which are durably water-repellent and soiling-repellent and which in particular sustainedly reduce the adhesion of ice, water, and soiling to wind energy systems, aircraft, or parts thereof, more particularly to rotor blades of wind energy systems.

The coating material compositions ought, further, to result in coatings which at the same time also meet the exacting requirements in the sector of the coating of rotor blades of wind energy systems, especially in terms of very good mechanical and photochemical resistance.

Moreover, the coating material compositions ought to exhibit good and very rapid curing at low temperatures of not more than 80° C., in other words ought to be cured, after just 30 minutes' curing at 60° C., to an extent such that initial assembly operations or demasking can be performed without damage to the coating. At the same time, however, a sufficiently long processing life ("pot life") of the coating material compositions ought to be ensured. Pot life is understood to be the timespan within which the coating material composition reaches twice its initial viscosity.

Furthermore, the resultant coatings ought to have a very good overall visual appearance, very high hardness, good chemicals resistance, and good scores in the other mechanotechnological properties typically required in automotive refinish and in the painting of plastics substrates and/or commercial vehicles.

Lastly, the coating material compositions ought to be able to be prepared very simply and inexpensively.

Solution

In the light of the aforementioned statement of a problem, a nonaqueous coating material composition has been found, comprising (A) 30% to 80% by weight, preferably from 50% to 70% by weight, of a polyhydroxyl and (per)fluoroalkyl group-containing (meth)acrylate component (A),
(B) 20% to 70% by weight, preferably from 30% to 50% by weight, of one or more polyisocyanate group-containing compounds (B), and
(D) one or more catalysts (D),
the weight percentages of components (A) and (B) being based in each case on the binder content of components (A) and (B), respectively, and the sum of the weight fractions of components (A) plus (B) being in each case 100% by weight,
wherein the poly(meth)acrylate component (A) comprises 0.05% to 15.0% by weight, based in each case on the amount of all of the compounds used in preparing the poly(meth)acrylate component (A), of one or more fluorine-containing reaction products (U) of
(i) one or more diisocyanates (PI) having isocyanate groups with different reactivities,
(ii) one or more (per)fluoroalkyl monoalcohol components (FA), and
(iii) optionally one or more compounds (V) having at least one group (G1) that is reactive toward isocyanate groups, and optionally having a further functional group (G2), which is different from group (G1).

The present invention further provides coating methods using these coating material compositions, and also the use of the coating material compositions as clearcoat material and for the coating of wind energy systems or aircraft, or parts thereof, more particularly as an anti-icing coating.

It is surprising and could not have been foreseen that the coating material compositions of the invention ensure good adhesion to the respective substrate or to a coating already present on the substrate, and also good recoatability on the part of the resultant coating. At the same time the coating materials lead to coatings which are durably water-repellent and soiling-repellent and which in particular sustainedly reduce the adhesion of ice, water, and soiling to wind energy systems, aircraft, or parts thereof, especially to rotor blades of wind energy systems.

Furthermore, the coating material compositions lead to coatings which at the same time also meet the exacting requirements in the coating of rotor blades of wind energy systems, especially in respect of very good mechanical and photochemical resistance.

Moreover, at low temperatures of not more than 80° C., the coating material compositions exhibit good and very rapid curing, in other words being cured after just 30 minutes' curing at 60° C. to an extent such that initial assembly operations or demasking can be carried out without damage to the coating. At the same time, however, a sufficiently long processing life ("pot life") of the coating material compositions is ensured.

Furthermore, the resultant coatings are notable for a good overall visual appearance, very high hardness, good chemicals resistance, and good scores in other mechano-technological properties commonly required in automotive refinish and in the painting of plastics substrates and/or commercial vehicles.

Finally, the coating material compositions can be prepared easily and inexpensively.

DETAILED DESCRIPTION OF THE INVENTION

The Poly(Meth)Acrylate Component (A)

As is evident from the detailed description below, the poly(meth)acrylate component (A) comprises, more particularly, saturated poly(meth)acrylate copolymers.

It is essential to the invention that the poly(meth)acrylate component (A) comprises as a synthesis component 0.05% to 15.0% by weight, preferably 0.1% to 10.0% by weight, based in each case on the amount of all of the compounds used in preparing the poly(meth)acrylate component (A), of one or more fluorine-containing reaction products (U) of
(i) one or more diisocyanates (PI) having two isocyanate groups with different reactivities,
(ii) one or more (per)fluoroalkyl monoalcohol components (FA), and
(iii) optionally one or more compounds (V) having at least one group (G1) that is reactive toward isocyanate groups, and optionally having a further functional group (G2), which is different from the group (G1).

The fluorine-containing reaction products (U) here may be introduced in various ways into the poly(meth)acrylate component (A).

For example, it is possible first to prepare a hydroxyl group-containing poly(meth)acrylate resin and then, by means of a polymer-analogous reaction, to react some of the hydroxyl groups of the poly(meth)acrylate component (A) with the remaining free isocyanate groups of a reaction product (U) containing fluorine and isocyanate groups.

The reaction product (U) containing fluorine and isocyanate groups is preparable for example from
(i) one or more diisocyanates (PI) having two isocyanate groups which have different reactivities, and
(ii) one or more (per)fluoroalkyl alcohol components (FA).

In addition it is also possible first to prepare a hydroxyl group-containing poly(meth)acrylate resin which also has other functional groups, such as carboxyl groups, anhydride groups, epoxide groups, or the like, for example, and then to react these further functional groups with a fluorine-containing reaction product (U) which also has other functional groups which are able to react with the other functional groups of the poly(meth)acrylate resin.

This reaction product (U) containing fluorine groups is in this case preparable, for example, from
(i) one or more diisocyanates (PI) having two isocyanate groups with different reactivities,
(ii) one or more (per)fluoroalkyl alcohol components (FA), and
(iii) one or more saturated compounds (V) having at least one group (G1) that is reactive toward isocyanate groups, and optionally having a further functional group (G2) which is different from the group (G1).

Examples of suitable compounds (V) are, for example, polymeric polyols having at least two hydroxyl groups, such as, for example, polyester polyols, polyalkylene ether polyols, polycarbonate polyols, polyester carbonate polyols, polyacetal polyols, polyurethane polyols, or polysiloxane polyols. Preferred polymeric polyols are polyesters, polyalkylene ethers, polyester carbonates, and polycarbonates.

This reaction of the diisocyanate or diisocyanates (PI) with the compound or compounds (V) and with the (per)fluoroalkyl alcohol or alcohols (FA) may take place at the same time or else in stages, by the reaction first, for example, of the isocyanate component with one or more compounds (V), and then the reaction of the resultant intermediate with the (per)fluoroalkyl alcohol component (FA).

It is preferred, however, to prepare the (per)fluoroalkyl group-containing poly(meth)acrylate component (A) not by way of a polymer-analogous reaction, but instead by polymerization of corresponding ethylenically unsaturated reaction products (U) containing (per)fluoroalkyl groups.

As fluorine-containing synthesis component, therefore, the poly(meth)acrylate component (A) preferably comprises the reaction product (U) of
(i) one or more diisocyanates (PI) having two isocyanate groups which have different reactivities,
(ii) one or more (per)fluoroalkyl monoalcohol components (FA), and
(iii) one or more compounds (V) having a group (G1) that is reactive toward isocyanate groups, and having an ethylenically unsaturated double bond (G2).

The use of these specific ethylenically unsaturated, fluorine-containing reaction products (U) as a synthesis component ensures high compatibility with the other ethylenically unsaturated compounds used for preparing the poly(meth)acrylate component (A). It is therefore not generally necessary, in the case of the perfluoroalkyl group-containing, ethylenically unsaturated reaction products used in accordance with the invention, for them to be supplied—as is necessary with conventional, commercial fluorine-containing monomers—in a separate feed; instead, they can be used together with the remaining monomers.

For the preparation both of the aforementioned reaction products (U), containing fluorine and isocyanate groups, and of the ethylenically unsaturated, fluorine-containing reaction products (U) that are preferably employed, it is essential to the invention to use diisocyanates (PI) having two isocyanate groups with different reactivities, such as isophorone diisocyanate, for example. This ensures that selectively monofluorinated reaction products are obtained and accordingly that—if at all—only an extremely small fraction of bifluorinated reaction products are obtained. This in turn means that the fluorinated reaction products (U) are incorporated very completely into the poly(meth)acrylate component (A) and hence also, in the resulting cured coating, into the network.

For the preparation both of the aforementioned fluorine group-containing reaction products (U) and of the ethylenically unsaturated, fluorine-containing reaction products (U) that are preferably employed, it is preferred as (per)fluoroalkyl monoalcohol component (FA) to use perfluoroalcohols of the general formula (I)

and/or of the general formula (II)

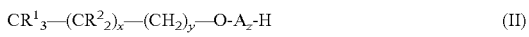

in which $R^1$ and $R^2$ independently of one another are H, F, or $CF_3$, but $R^1$ and $R^2$ must not simultaneously be H,
x is 1-20, y is 1-6, and z is 0-100,
A is $CR'R''$—$CR'''R''''$—O or $(CR'R'')_a$—O or CO—$(CR'R'')_b$—O,
$R'$, $R''$, $R'''$, and $R''''$ are independently of one another H, alkyl, cycloalkyl, aryl, or any organic radical having 1 to 25 C atoms,
a and b are each 3-5,
and the polyalkylene oxide structural unit A, comprises homopolymers, copolymers or block polymers of any desired alkylene oxides, or comprises polyoxyalkylene glycols, or comprises polylactones.

Examples of compounds suitable as perfluoroalkyl alcohols (FA) are for example the (per)fluoroalkyl alcohols described in WO2008/040428, page 33, line 4 to page 34, line 3, and also the (per)fluoroalkyl alcohols described in EP-B-1 664 222 B1, page 9, paragraph [0054], to page 10, paragraph [0057].

Employed more particularly in accordance with the invention are perfluoroalkyl alcohols (FA) of the formula (III)

and/or of the formula (IV)

where
l is 1-8, preferably 1 to 6, more preferably 2 to 3,
m is 1 to 15, preferably 5 to 15,
n is 1 to 12, preferably 1 to 6,
o is 1 to 10, preferably 1 to 4.

Examples of suitable perfluoroalcohols are 3,3,4,4,5,5,6,6,7,7,8,8,8-tridecafluorooctan-1-ol, 3,3,4,4,5,5,6,6,7,7,8,8,9,9,10,10,10-heptadecafluoro-decan-1-ol, 3,3,4,4,5,5,6,6,7,7,8,8,9,9,10,10,11,11,12,12,12-heneicosafluorododecan-1-ol, 3,3,4,4,5,5,6,6,7,7,8,8,9,9,10,10,11,11,12,12,13,13,14,14,14-pentacosafluorotetradecan-1-ol, 3,3,4,4,5,5,6,6,7,7,8,8,9,9,10,10,11,11,12,12,13,13,14,14,15,15,16,16,16-nonacosafluorohexadecan-1-ol, 3,3,4,4,5,5,6,6,7,7,8,8-dodecafluoroheptan-1-ol, 3,3,4,4,5,5,6,6,7,7,8,8,9,9,10,10-hexadecafluorononan-1-ol, 3,3,4,4,5,5,6,6,7,7,8,8,9,9,10,10,11,11,12,12-eicosafluoroundecan-1-ol, 3,3,4,4,5,5,6,6,7,7,8,8,9,9,10,10,11,11,12,12,13,13,14,14-tetracosafluorotridecan-1-ol, and 3,3,4,4,5,5,6,6,7,7,8,8,9,9,10,10,11,11,12,12,13,13,14,14,15,15,16,16-octacosafluoropentadecan-1-ol.

Particularly preferred both for preparing the abovementioned, fluorine group-containing reaction products (U) and for preparing the ethylenically unsaturated, fluorine-containing reaction products (U) that are preferably employed, as (per)fluoroalkyl alcohol component (FA), are perfluoroalcohols of the general formula (V)

or mixtures of different fluoroalcohols of the formula (V), in which r is 1 to 8, preferably 1 to 6, more particularly 1 to 4, and p is 1 to 6, more particularly 1 to 2.

Employed more particularly are perfluoroalkylethanols of the formula (V) with p=2, preferably 2-(perfluorohexyl)ethanol and 2-(perfluorooctyl)-ethanol, and mixtures of different perfluoroalkyl ethanols of the formula (V), more particularly a mixture of 2-(perfluorohexyl)ethanol and 2-(perfluoro-octyl)ethanol, optionally together with other (per)fluoroalkylethanols. It is preferred to use perfluoroalkylethanol mixtures with 30% to 49.9% by weight of 2-(perfluorohexyl)ethanol and 30% to 49.9% by weight of 2-(perfluorooctyl)ethanol, such as the commercial products Fluowet® EA 612 and Fluowet® EA 812; 2-(perfluorohexyl)ethanol, such as the commercial product Daikin A-1620, or 2-(perfluorooctyl)ethanol, such as the commercial product Daikin A-1820, from Daikin Industries Ltd., Osaka, Japan. It is especially preferred to use 2-(perfluorohexyl)ethanol.

Examples of compounds contemplated as compounds (V) having a group (G1) that is reactive toward isocyanate groups, and having an ethylenically unsaturated double bond (G2), include compounds having an ethylenically unsaturated double bond and additionally containing a hydroxyl, amino, mercapto, carboxyl or amide group. Contemplated more particularly as compound (V) are compounds having an acrylically and/or methacrylically unsaturated double bond, which also contain a hydroxyl, amino, mercapto, carboxyl or amide group. Contemplated with particular preference as component (V) are compounds having an acrylically and/or methacrylically unsaturated double bond and additionally containing a hydroxyl group.

Examples of suitable ethylenically unsaturated compounds (V) are ethylenically unsaturated monocarboxylic acids and ethylenically unsaturated dicarboxylic acids and also the hydroxyalkyl esters thereof, such as, for example, acrylic acid, methacrylic acid, ethacrylic acid, crotonic acid, maleic acid, fumaric acid, itaconic acid, citric acid, and the hydroxyalkyl esters thereof, and also alkyl esters containing amino groups, such as butylaminoethyl methacrylate in particular.

With particular preference the compound (V) is selected from the group consisting of hydroxyalkyl acrylate, hydroxyalkyl methacrylate, hydroxycycloalkyl acrylate, hydroxycycloalkyl methacrylate, and mixtures thereof.

Examples of hydroxyalkyl (meth)acrylates that are used with preference are 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, and similar.

As ethylenically unsaturated compounds (V) having a group (G1) that is reactive toward isocyanate groups it is also possible in particular to use reaction products of lactones with hydroxyalkyl acrylates, hydroxyalkyl methacrylates, and mixtures thereof. These may be homopolymers or copolymers of lactones, preferably adducts of lactones with suitable difunctional starter molecules, said adducts containing terminal hydroxyl groups. Examples of suitable lactones are [ε]-caprolactone, [β]-propiolactone, [γ]-butyrolactone and/or methyl-[ε]-caprolactone, and also mixtures thereof. Instead of the polymers of lactones it is also possible, with more particular preference, to use the corresponding chemically equivalent polycondensates of the hydroxycarboxylic acids corresponding to the lactones.

As ethylenically unsaturated compounds (V) having a group (G1) that is reactive toward isocyanate groups it is also possible, furthermore, to use hydroxyalkyl acrylates, hydroxyalkyl methacrylates, and mixtures thereof that are modified with a polymeric polyol, such as, for example, hydroxyalkyl acrylates, hydroxyalkyl methacrylates, and mixtures thereof, that are modified with polyester polyols, polyalkylene ether polyols, polycarbonate polyols, polyester carbonate polyols, polyacetal polyols, polyurethane polyols, or polysiloxane polyols. Preferred polymeric polyols are polyesters, polyalkylene ethers, polyester carbonates, and polycarbonates.

With particular preference the poly(meth)acrylate component (A) comprises as fluorine-containing synthesis component the reaction product (U) of
(i) one or more aliphatic and/or cycloaliphatic diisocyanates (PI) having two isocyanate groups with different reactivities,
(ii) one or more (per)fluoroalkyl alcohol components (FA) of the formula (V)

$$CF_3-(CF_2)_r-(CH_2)_p-OH \qquad (V)$$

in which r is 1 to 8, preferably r is 1 to 6, more preferably r is 1 to 4, and p is 1 to 6, preferably p is 1 to 2, and
(iii) one or more compounds (V) having a hydroxyl group G1 and having an acrylically and/or methacrylically unsaturated double bond (G2), preferably selected from the group consisting of hydroxyalkyl acrylate, hydroxyalkyl methacrylate, hydroxyalkyl acrylate reacted with lactone, hydroxyalkyl methacrylate reacted with lactone, and mixtures thereof.

With very particular preference the poly(meth)acrylate component (A) comprises as fluorine-containing synthesis component the reaction product (U) of isophorone diisocyanate, 2-(perfluorohexyl)ethanol, and hydroxyethyl acrylate and/or hydroxyethyl methacrylate and/or hydroxyalkylcaprolactone acrylate and/or hydroxyalkylcaprolactone methacrylate.

The proportions of components (PI), (FA) and (V) may vary. However, for the polymer-analogous introduction of the perfluoroalkyl groups, preferred reaction products (U) are those of
(i) 1 mol of one or more diisocyanates (PI) having two isocyanate groups which have different reactivities, and
(ii) 1 mol of one or more (per)fluoroalkyl monoalcohol components (FA).

Particular preference is given to using poly(meth)acrylate components (A) which comprise as fluorine-containing synthesis component the reaction product (U) of
(i) 1 mol of one or more diisocyanates (PI) having two isocyanate groups with different reactivities,
(ii) 1 mol of one or more (per)fluoroalkyl monoalcohol components (FA), and
(iii) 1 mol of one or more ethylenically unsaturated compounds (V) having at least one group (G1) that is reactive toward isocyanate groups.

It is further preferred in accordance with the invention for the poly(meth)acrylate component (A) to consist of one or more saturated perfluoroalkyl and polyhydroxyl group-containing polyacrylates or of one or more saturated perfluoroalkyl and polyhydroxyl group-containing polymethacrylates, or of a mixture of one or more saturated perfluoroalkyl and polyhydroxyl group-containing polyacrylates and one or more saturated perfluoroalkyl and polyhydroxyl group-containing polymethacrylates. As component (A) it is, however, also possible, of course, to use mixtures of one or more saturated perfluoroalkyl and optionally saturated polyhydroxyl group-containing poly(meth)acrylates with saturated polyhydroxyl group-containing poly(meth)acrylates that are free of fluorine groups. In that case it should merely be ensured that the mixture contains 0.05% to 15% by weight, preferably 0.1% to 10.0% by weight, based in each case on the amount of all of the compounds used in preparing the poly(meth)acrylate component (A), of one or more fluorine-containing reaction products (U).

With particular preference the poly(meth)acrylates used as component (A) are saturated and synthesized from
(a1) 0.05% to 15% by weight, preferably 0.1% to 10% by weight, of one or more fluorine-containing, ethylenically unsaturated reaction products (U),
(a2) 10% to 50% by weight, preferably 15% to 45% by weight, of one or more hydroxyl group-containing monomers,
(a3) 10% to 89.95% by weight, preferably 30% to 84.9% by weight, of one or more alkyl and/or cycloalkyl esters of ethylenically unsaturated carboxylic acids,
(a4) 0% to 50% by weight, preferably 0% to 30% by weight, of one or more vinylaromatic compounds, and
(a5) 0% to 10% by weight, preferably 0% to 5% by weight, of further ethylenically unsaturated monomers,
the sum of the weight fractions of the monomers (a1) to (a5) being in each case 100% by weight.

Suitability as monomer (a2) is possessed by the hydroxyalkyl (meth)acrylates and hydroxycycloalkyl (meth)acrylates, and also hydroxyalkyl esters and hydroxycycloalkyl esters of ethylenically unsaturated carboxylic acids, such as fumaric, crotonic, and maleic acid, and mixtures thereof, that were already listed above as compound (V).

Especially suitable as monomer (a3) are alkyl esters of ethylenically unsaturated carboxylic acids without active hydrogen, more preferably alkyl esters without a further functional group, very preferably alkyl esters of saturated monoalcohols with ethylenically unsaturated carboxylic acids. Examples of such alkyl esters of ethylenically unsaturated carboxylic acids (a3) are alkyl esters and cycloalkyl esters of acrylic, methacrylic, fumaric, crotonic, and maleic acid, preferably of acrylic and/or methacrylic acid, such as, preferably, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate, or lauryl methacrylate, cycloalkyl acrylates and/or cycloalkyl methacrylates, such as cyclopentyl acrylate, cyclopentyl methacrylate, isobornyl acrylate, isobornyl methacrylate, cyclohexyl acrylate and/or cyclohexyl methacrylate.

Especially suitable as monomer (a4) are vinylaromatic compounds without active hydrogen. Examples of suitable vinylaromatic compounds (a4) are vinylaromatic hydrocarbons such as vinyltoluene, alpha-methylstyrene, or, in particular, styrene.

Especially suitable as monomer (a5) are ethylenically unsaturated compounds having at least two polymerizable, ethylenically unsaturated double bonds without active hydrogen. Examples of suitable ethylenically unsaturated monomers (a5) having at least two polymerizable, ethylenically unsaturated double bonds are diesters of saturated dialcohols with ethylenically unsaturated carboxylic acids, more particularly diesters of saturated dialcohols with acrylic, methacrylic, fumaric, crotonic, and maleic acid, preferably of acrylic and/or methacrylic acid, such as, for example, hexanediol diacrylate, hexanediol dimethacrylate, glycol diacrylate, glycol dimethacrylate, butanediol diacrylate, butanediol dimethacrylate, trimethylolpropane triacrylate, and trimethylolpropane trimethacrylate. As monomer (a5) it is also possible, finally, to use a reaction product of a polyisocyanate and of an unsaturated alcohol or of an amine. An example that may be given of this is the reaction product of one mole of hexamethylene diisocyanate and two moles of allyl alcohol, or the reaction product of isophorone diisocyanate and hydroxyethyl acrylate.

As further ethylenically unsaturated compounds (a5) different from the monomers (a1) to (a4) it is also possible to use silicon-free monomers without active hydrogen, such as nitriles of acrylic or methacrylic acid, vinyl esters or vinyl ethers, ethylenically unsaturated carboxamides, such as acrylamide, methacrylamide, itaconamide, α-ethylacrylamide, crotonamide, fumaramide, and maleamide, for example.

The poly(meth)acrylate polyols that are especially preferred in accordance with the invention are generally copolymers and preferably have mass-average molecular weights Mw of between 1000 and 20 000 daltons, more particularly between 1500 and 10 000 daltons, in each case measured by means of gel permeation chromatography (GPC) against a polystyrene standard.

The glass transition temperature of the copolymers is generally between −100 and 100° C., more particularly between −60 and ≤60° C. (measured by means of DSC measurements in accordance with DIN-EN-ISO 11357-2).

The poly(meth)acrylate polyols preferably have an OH number of 60 to 300 mg KOH/g, more particularly between 70 and 200 mgKOH/g.

The hydroxyl number (OH number) indicates the number of mg of potassium hydroxide that are equivalent to the amount of acetic acid bonded by 1 g of substance in acetylation. For the determination, the sample is boiled with acetic anhydride-pyridine, and the acid formed is tritrated with potassium hydroxide solution (DIN 53240-2). In the case of pure poly(meth)acrylates, the OH number can also be determined with sufficient accuracy by calculation on the basis of the OH-functional monomers used.

The poly(meth)acrylate polyols preferably have an acid number of between 0 and 30 mg KOH/g. The acid number here indicates the number of mg of potassium hydroxide which are consumed in the neutralization of 1 g of the respective compound (DIN EN ISO 2114).

Polyhydroxyl Group-Containing Compounds (C)

Optionally, apart from the polyhydroxyl group-containing poly(meth)acrylate component (A), the coating material compositions of the invention may further comprise one or more monomeric, saturated, polyhydroxyl group-containing compounds, different from the component (A), and/or saturated oligomeric and/or saturated polymeric polyester polyols, polyurethane polyols, and polysiloxane polyols, more particularly saturated polyester polyols, (C). These compounds (C) preferably occupy a fraction of 0% to 20% by weight, more preferably of 0% to 10% by weight, very preferably of 1% to 5% by weight, based in each case on the binder fraction of the coating material composition.

Suitable polyester polyols are described for example in EP-A-0 994 117 and EP-A-1 273 640. Polyurethane polyols are prepared preferably by reacting polyester polyol prepolymers with suitable diisocyanates or polyisocyanates, and are described for example in EP-A-1 273 640. Suitable polysiloxane polyols are described for example in WO-A-01/09260.

As hydroxyl-containing compound (C) it is possible to use low molecular mass polyols. Low molecular mass polyols used are, for example, diols, such as preferably ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butanetriol, pentaerythritol, and dipentaerythritol. Low molecular mass polyols of these kinds are preferably admixed in minor fractions to the polyol component (A).

The Polyisocyanate Group-Containing Component (B)

The isocyanate group-containing compounds (B) that are used in accordance with the invention are preferably conventional substituted or unsubstituted aromatic, aliphatic, cycloaliphatic and/or heterocyclic diisocyanates and/or polyisocyanates.

Examples of suitable diisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenyl-methane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates.

Further preferred polyisocyanates are the isocyanurate trimers and/or allophanate dimers and/or biuret dimers and/or uretdione dimers of the aforementioned diisocyanates.

In a further embodiment of the invention, the polyisocyanates are polyisocyanate prepolymers having urethane structural units, which are obtained by reacting polyols with a stoichiometric excess of aforementioned polyisocyanates. Polyisocyanate prepolymers of this kind are described for example in U.S. Pat. No. 4,598,131.

Particularly preferred polyisocyanate components (B) are hexamethylene diisocyanate, isophorone diisocyanate, and 4,4'-methylenedicyclohexyl diisocyanate and/or the isocyanurate trimer and/or allophanate dimer and/or biuret dimer and/or uretdione dimer thereof.

The polyisocyanate component (B) therefore differs from the isocyanate group-containing reaction products (U) that are optionally used in preparing the component (A) in particular in having a higher isocyanate group content, since component (B) has on average at least two isocyanate groups per molecule, whereas the isocyanate group-containing reaction products (U) have on average less than two, preferably one, isocyanate group(s) per molecule.

Catalyst (D)

As catalyst (D) it is possible to use conventional compounds. Examples are Lewis acids (electron-deficient compounds), such as, for example, tin naphthenate, tin benzoate, tin octoate, tin butyrate, dibutyltin dilaurate, dibutyltin diacetate, dibutyltin oxide, lead octoate, amine adducts of phosphoric acid or of sulfonic acid (e.g., Nacure products from King Industries). In the coating materials it is preferred to use the catalysts which are also used for preparing the reaction products (U). Employed more particularly, therefore, are those catalysts which ensure a selective reaction of only one isocyanate group during the preparation of the reaction products, such as tin-containing catalysts in particular.

It is preferred to use 0.001% to 5% by weight, preferably 0.01% to 2% by weight, based in each case on the binder content of the sum of components (A) plus (B), of one or more catalysts (D).

Monomeric, Aromatic Carboxylic Acid (S)

For improving the assembly strength and the mechanical properties it is preferred, furthermore, for the coating material composition to comprise at least one monomeric, aromatic, optionally substituted carboxylic acid (S) whose carboxyl group is in conjugation with a π-electron system. The number of carboxyl groups here may vary, with the carboxylic acids preferably having one carboxyl group. The monomeric, aromatic, optionally substituted carboxylic acids preferably have a molecular weight <500 g/mol, more preferably <300 g/mol. It is preferred to use monomeric, aromatic, optionally substituted carboxylic acids which have a pKa of 2 to 5. The pKa corresponds to the pH at the half-equivalent point, with the solution medium being preferably water. Should it not be possible, for an acid, to specify a pKa in water, then the medium selected is preferably DMSO or else another suitable medium in which the acid is soluble.

Suitability is possessed by monomeric, aromatic monocarboxylic and polycarboxylic acids, the corresponding alkyl- and aryl-substituted aromatic monocarboxylic and polycarboxylic acids, and also the corresponding hydroxyl group-containing aromatic monocarboxylic and polycarboxylic acids, such as, for example, phthalic acid and terephthalic acid, alkyl- and/or aryl-substituted phthalic acid and terephthalic acid, benzoic acid and alkyl- and/or aryl-substituted benzoic acid, aromatic carboxylic acids having further functional groups such as salicylic acid and acetylsalicylic acid, alkyl- and/or aryl-substituted salicylic acid or isomers thereof, polycyclic aromatic carboxylic acids, such as the isomers of naphthalene-carboxylic acid, and derivatives thereof.

As monomeric, aromatic carboxylic acid (S) the coating material composition preferably comprises benzoic acid, tert-butylbenzoic acid, 3,4-dihydroxybenzoic acid, salicylic acid and/or acetylsalicylic acid, more preferably benzoic acid.

The Combination of Components (A), (B), Optionally (C), (D), and Optionally (S), and Also Further Components of the Coating Material Compositions Where the coating material compositions are one-component compositions, polyisocyanate group-containing compounds (B) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and the like. With particular preference the isocyanate groups of component (B) are used in nonblocked form.

In the case of the 2-component (2K) coating material compositions, a coating component comprising the polyhydroxyl group-containing compound (A), and also further components, described below, is mixed, shortly before the application of the coating material, with a further coating component comprising the polyisocyanate group-containing compound (B) and also, optionally, other of the components described below, with mixing taking place in a conventional way, and with—generally—the coating component which comprises the compound (A) also comprising the catalyst (D) and a portion of the solvent.

The polyhydroxy component (A) may be in a suitable solvent. Suitable solvents (L) are those which permit sufficient solubility of the polyhydroxy component and which in the coating material are chemically inert toward the compounds (A), (B), (D), (S), and optionally (C), and which also do not react with (A), optionally (C), (B), (D), and (S) in the course of the curing of the coating material. More particularly these solvents (L) are aprotic solvents. Examples of such aprotic solvents (L) are given later on below.

The coating material compositions of the invention cure via reaction of the hydroxyl groups in components (A) and optionally (C) with the isocyanate groups in component (D).

The weight fractions of the polyol (A) and optionally (C), and of the polyisocyanate (B), are preferably selected such that the molar equivalents ratio of the hydroxyl groups of the polyhydroxyl group-containing compound (A) plus optionally (C) to the isocyanate groups of component (B) is between 1:0.9 and 1:1.5, preferably between 1:0.9 and 1:1.1, more preferably between 1:0.95 and 1:1.05.

Coating material compositions used in accordance with the invention contain from 30% to 80% by weight, preferably from 50% to 70% by weight, based in each case on the binder content of component (A), of the polyhydroxyl group-containing and (per)fluoroalkyl group-containing poly(meth)acrylate component (A), and from 20% to 70% by weight, preferably from 30% to 50% by weight, based in each case on the binder content of component (B), of the polyisocyanate group-containing compound(s) (B), with the sum of the weight fractions of components (A) plus (B) always being 100% by weight.

The coating material compositions of the invention further comprise preferably 0.001% to 5% by weight, more preferably from 0.01% to 2% by weight, based in each case on the binder content of the sum of components (A) plus (B), of one or more catalysts (D).

The coating material compositions of the invention preferably further preferably comprise 0.2% to 15.0% by weight, preferably 0.5% to 8.0% by weight, and more preferably 0.5% to 5.0% by weight of at least one aromatic carboxylic acid (S), the weight percentages being based in each case on the binder content of the sum of the components (A) plus (B).

The binder fraction means in each case that fraction of the coating material composition that is soluble in tetrahydrofuran (THF), prior to crosslinking. It is determined by weighing a small sample (P), dissolving it in 50 to 100 times the amount of THF, removing insoluble constituents by filtration, evaporating the THF, and then ascertaining the solids of the constituents previously dissolved in THF, by drying at 130° C. for 60 minutes, cooling in a desiccator, and then reweighing. The residue corresponds to the binder content of the sample (P).

The sum of the weight fractions of components (A) plus (B) (but taking into account in each case only the binder fraction, but not any solvent fraction that may be present) thus produces in each case 100% by weight, and the amounts of components (D) and (S) are based on this sum of the weight fractions of components (A) plus (B).

The coating material compositions of the invention are preferably nonaqueous coating materials and may comprise solvents or may be formulated as solvent-free systems.

Solvents (L) especially suitable for the coating material compositions of the invention are those which in the coating material are chemically inert toward the compounds (A) and (B) and also do not react with (A) and (B) in the course of the curing of the coating material. Examples of such solvents (L) are aliphatic and/or aromatic hydrocarbons such as toluene, xylene, solvent naphtha, Solvesso 100 or Hydrosol® (from ARAL), ketones, such as acetone, methyl ethyl ketone, or methyl amyl ketone, esters, such as ethyl acetate, butyl acetate, pentyl acetate, or ethyl ethoxy-propionate, ethers, or mixtures of the aforementioned solvents. The aprotic solvents or solvent mixtures preferably have a water content of not more than 1% by weight, more preferably not more than 0.5% by weight, based on the solvent.

The solvent or solvents (L) are used in the coating material compositions of the invention preferably in an amount such that the solids content of the coating material composition is at least 50% by weight, more preferably at least 60% by weight.

The coating material compositions of the invention may further comprise 0% to 30% by weight, preferably 0% to 15% by weight, based in each case on the binder content of the coating material composition, of one or more amino resins and/or one or more tris(alkoxycarbonyl-amino)triazines (E).

Examples of suitable tris(alkoxycarbonylamino)triazines are given in U.S. Pat. No. 4,939,213, in U.S. Pat. No. 5,084,541 and in EP-A-0 624 577.

Examples of suitable amino resins (E) are all amino resins that are typically used in the paint industry, the properties of the resultant coating materials being controllable via the reactivity of the amino resin. The resins in question are condensation products of aldehydes, more particularly formaldehyde, and, for example, urea, melamine, guanamine, and benzoguanamine. The amino resins contain alcohol groups, preferably methylol groups, which in general are partly or, preferably, fully etherified with alcohols. Use is made more particularly of amino resins etherified with lower alcohols. It is preferred to use amino resins etherified with methanol and/or ethanol and/or butanol, examples being products available commercially under the names Cymel®, Resimene®, Maprenal®, and Luwipal®.

The amino resins (E) are well-established compounds and are described in detail, for example, in American patent application US 2005/0182189 A1, page 1, paragraph [0014], to page 4, paragraph [0028].

The binder mixture of the invention or coating material composition of the invention may further comprise at least one customary and known coatings additive (F) in effective amounts, i.e., in amounts preferably of up to 20% by weight, more preferably up to 15% by weight, and more particularly up to 10% by weight, based in each case on the binder content of the coating material composition.

Examples of suitable coatings additives (F) are as follows:
particularly UV absorbers;
particularly light stabilizers such as HALS compounds, benzotriazoles, or oxalanilides;
radical scavengers;
slip additives;
polymerization inhibitors;
defoamers;
reactive diluents different from components (A) and (C), more particularly reactive diluents which only become reactive through reaction with other constituents and/or with water, such as Incozol® or aspartic esters, for example;
wetting agents different from components (A) and (C), such as siloxanes, fluorine-containing compounds, carboxylic monoesters, phosphoric esters, polyacrylic acids and copolymers thereof, or polyurethanes;
adhesion promoters;
flow control agents;
film-forming assistants such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheologic control additives different from components (A) and (C), such as the additives known from patents WO 94/22968, EP-A-0 276 501, EP-A-0 249 201, or WO 97/12945; crosslinked polymeric microparticles, of the kind disclosed in EP-A-0 008 127, for example; inorganic phyllosilicates such as aluminum magnesium silicates, sodium magnesium phyllosilicates, and sodium magnesium fluorine lithium phyllosilicates of the montmorillonite type; silicas such as Aerosils®; or synthetic polymers with ionic and/or associative groups, such as poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes, or polyacrylates;
flame retardants.

Particularly preferred are coating material compositions comprising
50% to 70% by weight, based on the binder content of component (A), of at least one polyhydroxyl group-containing polyacrylate (A) and/or at least one polyhydroxyl group-containing polymethacrylate (A),
30% to 50% by weight, based on the binder content of component (B), of the polyisocyanate group-containing compound (B), 0% to 10% by weight, based on the binder content of the coating material composition, of the hydroxyl group-containing component (C), 0.5% to 8.0% by weight, based on the binder content of the sum of components (A) plus (B), of at least one aromatic carboxylic acid (S), 0% to 15% by weight, based on the binder content of the coating material composition, of one or more amino resins and/or one or more tris(alkoxycarbonyl-amino)triazines (E), 0% to 10% by weight, based on the binder content of the coating material composition, of at least one customary and known coatings additive (F), and 0.01% to 2% by weight of at least one catalyst (D), based on the binder content of the sum of components (A) plus (B), where the sum of the weight fractions of components (A) plus (B) is in each case 100% by weight and where the poly(meth)acrylate component (A) comprises 0.1% to 10.0% by weight, based in each case on the amount of all of the compounds used for preparing the poly(meth)acrylate component (A), of one or more fluorine-containing reaction products (U) of (i) one or more aliphatic and/or cycloaliphatic diisocyanates (PI) having two isocyanate groups which have different reactivities, (ii) one or more (per)fluoroalkyl alcohol components (FA)

in which n is 1 to 6, and also (iii) one or more compounds (V) having a hydroxyl group (G1) and having an acrylically and/or methacrylically unsaturated double bond (G2), preferably selected from the group consisting of hydroxyalkyl (meth)acrylate, hydroxyalkyl (meth)acrylate reacted with lactones, and mixtures thereof.

In another embodiment of the invention, the binder mixture of the invention or the coating material composition of the invention may also comprise further pigments and/or fillers and may serve for producing pigmented topcoats or pigmented undercoats or primer-surfacers, more particularly pigmented topcoats. The pigments and/or fillers used for these purposes are known to the skilled person. The pigments are typically used in an amount such that the pigment-to-binder ratio is between 0.05:1 and 1.5:1, based in each case on the binder content of the coating material composition.

Since the coatings of the invention produced from the coating materials of the invention adhere outstandingly even to already-cured electrocoats, primer-surfacer coats, basecoats, or customary and known clearcoats, they are outstandingly suitable, in addition to their use in automotive OEM finishing, for automotive refinishing and/or for the coating of parts for installation in or on motor vehicles, and/or for the coating of utility vehicles.

The coating material compositions of the invention may be applied by any of the customary application techniques, such as spraying, knifecoating, spreading, pouring, dipping, impregnating, trickling, or rolling, for example. With respect to such application, the substrate to be coated may itself be at rest, with the application unit or equipment being moved. Alternatively, the substrate to be coated, more particularly a coil, may be moving, with the application unit being at rest relative to the substrate or being moved appropriately.

Preference is given to employing spray application techniques, such as, for example, compressed air spraying, airless spraying, high-speed rotation, electrostatic spray application (ESTA), alone or in conjunction with hot spray application such as hot-air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application at elevated temperatures and/or through a reduced atmospheric humidity, provided this does not entail any instances of damage to or change in the coating films, such as a premature complete crosslinking, for instance.

The thermal curing of the coating materials has no peculiarities in terms of technique, but instead takes place in accordance with the customary and known techniques such as heating in a forced-air oven or irradiation with IR lamps. This thermal curing may also take place in stages. Another preferred curing technique is that of curing with near infrared (NIR radiation).

The thermal curing takes place advantageously at a temperature of 20 to 200° C. over a time of 1 minute to 10 hours, with the use of even longer cure times being possible at low temperatures. For automotive refinishing and for the painting of plastics parts and also the painting of utility vehicles, it is usual to employ relatively low temperatures, which are preferably between 20 and 80° C., more particularly between 20 and 60° C.

The coating material compositions of the invention are outstandingly suitable as decorative, protective and/or effect coatings and finishes on bodywork of means of transport (more particularly motor vehicles, such as cycles, motorcycles, buses, trucks or automobiles) or of parts thereof; especially for the coating of plastics parts for installation in or on automobile bodies, such as, for example, for the production of roofs, hatches, hoods, fenders, bumpers, spoilers, sills, protective strips, side trim, and the like, and also for the finishing of utility vehicles, such as, for example, of trucks, chain-driven construction vehicles, such as crane vehicles, wheel loaders, and concrete mixers, buses, rail vehicles, watercraft, aircraft, and also agricultural equipment such as tractors and combines, and parts thereof, and also of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

The coating material compositions of the invention may therefore be applied, for example, to an uncoated or precoated substrate, and the coating materials of the invention may be either pigmented or unpigmented. The coating material compositions of the invention are used preferably as clearcoat material. On account of the hydrophobic properties in tandem with good mechanical and photochemical resistances, they are also used for the permanent water-repellent and soiling-repellent surface coating of any of a very wide variety of uncoated or precoated substrates.

With particular preference, the coating material compositions of the invention are used in coating methods where a film with the coating material composition of the invention is applied to an optionally precoated substrate. This optionally precoated substrate is more particularly aircraft or wind energy systems or one or more parts thereof, more particularly the wind energy system rotor blades.

Furthermore, the coating material compositions of the invention are also used in methods where an optionally precoated substrate is coated first with a pigmented basecoat film and subsequently with a film comprising the coating material composition of the invention. The invention therefore also provides multicoat effect and/or color paint systems made up of at least one pigmented basecoat film and at least one clearcoat film disposed thereon, a characteristic of these systems being that the clearcoat film has been produced from the coating material composition of the invention.

It is possible to use water-thinnable basecoat materials and also basecoat materials based on organic solvents. Suitable basecoat materials are described for example in EP-A-0 692 007 and in the documents listed therein at column 3, lines 50 ff. Preferably the applied basecoat material is first dried, meaning that at least some of the organic solvent and/or water is removed from the basecoat film in an evaporation phase. Drying takes place preferably at temperatures from room temperature to 80° C. After drying has taken place, the coating material composition of the invention is applied. The two-coat paint system is then baked, preferably under conditions employed in the context of automotive OEM finishing, at temperatures of 20 to 200° C. for a time of 1 minute up to 10 hours, though at the temperatures employed for automotive refinish, which are generally between 20 and 80° C., more particularly between 20 and 60° C., it is also possible for longer cure times to be employed.

In a further preferred embodiment of the invention, the coating material composition of the invention is used as a transparent clearcoat material for the coating of plastics substrates, more particularly of plastics parts for installation internally or externally. These plastics parts are coated preferably likewise in a multistage coating method, in which a substrate which is optionally precoated or which has been pretreated for better adhesion of the subsequent coatings (e.g. by flame treatment, corona treatment or plasma treatment of the substrate) is coated first of all with a pigmented basecoat film and thereafter with a layer comprising the coating material composition of the invention.

The plastics parts for coating consist typically of ASA, polycarbonates, blends of ASA and polycarbonates, polypropylene, polymethyl methacrylates, or impact-modified polymethyl methacrylates, more particularly of blends of ASA and polycarbonates, used preferably with a polycarbonate fraction >40%, more particularly >50%.

By ASA are meant, in general, impact-modified styrene/acrylonitrile polymers, where graft copolymers of vinylaromatic compounds, more particularly styrene, and of vinyl cyanides, more particularly acrylonitrile, on polyalkyl acrylate rubbers are present in a copolymer matrix of styrene and acrylonitrile in particular.

With very particular preference, the coating material compositions of the invention are employed in the extremely demanding area of the coating methods of aircraft and wind energy systems or parts thereof, more particularly of wind energy rotor blades, especially as a topcoat (i.e., outermost coating film) on rotor blades of wind energy systems.

The present invention therefore also provides for use of the coating material compositions of the invention for the anti-icing coating of aircraft or wind energy systems or parts thereof, more particularly for the anti-icing coating of rotor blades of wind energy systems.

Furthermore, the invention also relates to the use of the coating material compositions of the invention for coating aircraft or rotor blades of wind energy systems for the purpose of reducing the noise generated by movement thereof.

The present invention accordingly also provides wind energy systems or one or more parts of a wind energy system with a paint system, optionally a multicoat paint system, the characteristic feature of these wind energy systems or parts thereof being that the topmost coating film has been produced from a coating material composition of the invention.

Examples 1 to 3

Preparation of the Inventive Fluoromonomer 1

In a 1 l three-neck flask, equipped with stirrer, reflux condenser, thermometer, and dropping funnel, 83 g of isophorone diisocyanate are introduced together with 0.1 g of dibutyltin dilaurate. The three-neck flask is heated to 55° C., and then slowly, via the dropping funnel, 40.7 g of the commercial fluoroalcohol based on 2-(perfluorohexyl)ethanol (commercial product Daikin A-1620 from Daikin Industries Ltd, Osaka, Japan) are added. An NCO content of 6.85%, determined by the below-described titration with dibutylamine, is maintained. Thereafter, likewise at 55° C., 14.5 g of hydroxyethyl methacrylate are added dropwise. Additionally, 5.2 g of butyl acetate are added. When an NCO content of below 0.01% has been reached, the system is cooled. The resultant clear, colorless solution has a fluoromonomer content of 93.3% by weight.

Preparation of Inventive Fluoromonomer 2

1 mol of hydroxyethyl methacrylate is stirred with 2 mol of epsilon-caprolactone with addition of 50 ppm of dibutyltin dilaurate at 120° C. for 2 hours. The reaction product is then added dropwise to a reaction product of 1 mol of fluoroalcohol and 1 mol of IPDI at 55° C.

Preparation of Inventive Fluoromonomer 3

1 mol of hydroxyethyl methacrylate is stirred with 4 mol of epsilon-caprolactone with addition of 50 ppm of dibutyltin dilaurate at 120° C. for 2 hours. The reaction product is then added dropwise to a reaction product of 1 mol of fluoroalcohol and 1 mol of IPDI at 55° C.

Determination of Fluoromonomer NCO Content:

The amount of unreacted NCO is determined using dibutylamine against bromophenol blue by means of titration with 0.5N hydrochloric acid, as follows: Before the actual titration, a determination for blank value is performed. For the blank value determination, an amount of dibutylamine added in a defined way is titrated, using bromophenol blue as indicator, with 0.5 mol/l aqueous hydrochloric acid from blue to yellow (pH=4.6 (blue)→pH=3.0 (yellow)). This consumption is taken as "consumption in the blank test".

For the main titration, the sample is fully consumed by reaction with dibutylamine. In this reaction, the N—C double bond is open, and dibutylamine is added on. This produces a urea derivative. Using bromophenol blue as indicator, the unreacted dibutylamine is back-titrated with 0.5 mol/l aqueous hydrochloric acid from blue to yellow. The color change must last for about 30 seconds. This consumption is taken as "consumption in the main test".

Preparation of Inventive Polymer Solutions with Different Fluoromonomers

A 4 l stainless steel pressure reactor, temperature-conditioned via an oil-heated stainless steel jacket, and equipped with an anchor stirrer, reflux condenser, and thermometer, is charged with 911.1 g of butyl acetate. The apparatus is flushed with nitrogen and then, under an overpressure of 2.5 bar, generated using nitrogen, the reactor is heated to 160° C. Membrane pumps are then used to meter 1200 g of the respective monomer mixture over 4 hours. In parallel, again using a membrane pump, with a preliminary run time of 10 minutes and with a total feed time of 4.75 hours, a 50% strength solution of di-tert-butyl peroxide (DTBP) is metered in in an amount of 7.0% by weight, based on the monomer amount. After a further 60 minutes at 160° C., the batch is cooled and the reactor is let down.

The polymer solutions obtained by the above process were diluted with butyl acetate to a solids fraction of approximately 60% and drawn down onto glass panels using a 100 μm four-way bar applicator. The contact angles were measured on these films after drying at 130° C. for 30 minutes.

To determine the hydrophobicity of the coating, one drop of water is applied to the surface under investigation of the cured coating. Then, under the microscope, a measurement is made of the contact angle (H), by determining the tangent at the point of contact between the water drop and the coating surface, using the Mobiledrop mobile contact angle measuring system from Krüss. The contact angle relative to diiodomethane is determined similarly. For the measurement, the measuring head is placed onto the sample. The metering lever lowers the metering canula and meters the drop. A prism arrangement guides the profile image of the drop via an integrated camera into the attached notebook PC. There, with the aid of the KRÜSS SW23 software (DSA2), the drop video is analyzed and the contact angle determined.

TABLE 1

Composition of the perfluoroalkyl alkyl group-containing poly(meth)acrylates of examples 1 to 3 in % by weight, and key data

| | Example 1 | Example 2 | Example 3 |
|---|---|---|---|
| Butyl acrylate | 22.00% | 22.00% | 22.00% |
| Methyl methacrylate | 15.50% | 15.50% | 15.50% |
| Hydroxyethyl methacrylate | 32.00% | 32.00% | 32.00% |
| Styrene | 30.00% | 30.00% | 30.00% |
| Fluoromonomer 1 (HEMA/IPDI/F-alcohol) | 5.00% | | |
| Fluoromonomer 2 (HEMA/2e-CAP/IPDI/F-alcohol) | | 5.00% | |
| Fluoromonomer 3 (HEMA/4e-CAP/IPDI/F-alcohol) | | | 5.00% |
| Acrylic acid | 0.50% | 0.50% | 0.50% |
| DTBP | 7.00% | 7.00% | 7.00% |
| SC theor | 77.5 | 77.5 | 77.5 |
| SC AP | 74.6 | 74.6 | 75.40% |

TABLE 1-continued

Composition of the perfluoroalkyl alkyl group-containing poly(meth)acrylates of examples 1 to 3 in % by weight, and key data

| | Example 1 | Example 2 | Example 3 |
|---|---|---|---|
| AN [mgKOH/g] | 11 | 10 | 11 |
| Viscosity [mPas] | 511 | 513.0 | 444.0 |
| Mw: | 5815 | 6360 | 6008 |
| Mn: | 2020 | 2112 | 2084 |
| Appearance | hazy | hazy | hazy |
| Contact angle $H_2O$ [°] | 116 +/−2.3 | 118 +/−1.3 | 119 +/−1.7 |
| Contact angle CH2I2 [°] | 87 +/−2.8 | 82 +/−2.4 | 90 +/−3.4 |

Key to table 1:
Mw = weight-average molecular weight, measured by gel permeation chromatography (GPC) against polystyrene standard
Mn = number-average molecular weight, measured by gel permeation chromatography (GPC) against a polystyrene standard
SC AP = (solids content after end of the polymerization reaction)
1 g of the substance under measurement is mixed with 1 g of butyl acetate on a support (metal lid) and dried in a forced-air oven at 130° C. for 60 minutes.
AN = measured acid number in mg KOH/g
Viscosity: measured at 23° C. using a Brookfield rotary viscometer, type CAP 2000+, spindle 3, RPM 1000 or shear rate 13 333 s$^{-1}$
Contact angle $H_2O$: measured contact angle with respect to water
Contact angle CH2I2: measured contact angle with respect to diiodomethane All of the fluoromonomers investigated were found to be incorporable into a polymer in the same way and also to have a comparable effect in terms of surface tension. Since fluoromonomer 1 can be prepared with the least chemical effort and complexity, further experiments were carried out using said monomer 1.

Examples 4 to 20

For determining the optimum formulation in terms of Tg, OH number, and fluoromonomer content, the following base formula was used to perform polymerizations by means of a high-throughput system. The batch size for all the syntheses was approximately 200 ml.

Variable components used were the following monomers:
Hydroxyethyl methacrylate (HEMA)
n-Butyl acrylate (nBA)
Styrene (Sty)
Methyl methacrylate (MMA)
Fluorine-containing monomer (1)

The following general polymerization conditions were specified: polymerization temperature 110° C., feed times 3 h monomer mixture, 3.5 h initiator solution, 1 h after polymerization, initiator 7% based on monomers, initiator solution in methyl isobutyl ketone (25% and 17.4% strength, respectively)

TABLE 2

Composition of the perfluoroalkylalkyl group-containing poly(meth)acrylates of examples 4 to 20 in % by weight

| Example | HEMA | Fluoromonomer 1 | MMA + Sty + nBA | Tg [° C.] | Tg [K] | Sty | nBA | MMA | OH number calculated [mg KOH/g] |
|---|---|---|---|---|---|---|---|---|---|
| 4 | 20.00% | 0.10% | 79.90% | 0 | 273.15 | 12.49% | 55.02% | 12.49% | 80.47 |
| 5 | 35.00% | 0.10% | 64.90% | 0 | 273.15 | 6.79% | 51.42% | 6.79% | 140.83 |
| 6 | 20.00% | 5.00% | 75.00% | 0 | 273.15 | 12.49% | 55.02% | 12.49% | 75.22 |
| 7 | 35.00% | 5.00% | 60.00% | 0 | 273.15 | 6.79% | 51.42% | 6.79% | 131.63 |
| 8 | 20.00% | 0.10% | 79.90% | 30 | 303.15 | 23.09% | 33.82% | 23.09% | 80.47 |
| 90 | 35.00% | 0.10% | 64.90% | 30 | 303.15 | 17.39% | 30.22% | 17.39% | 140.83 |
| 10 | 20.00% | 5.00% | 75.00% | 30 | 303.15 | 23.09% | 33.82% | 23.09% | 75.22 |
| 11 | 35.00% | 5.00% | 60.00% | 30 | 303.15 | 17.39% | 30.22% | 17.39% | 131.63 |
| 12 | 20.00% | 2.55% | 77.45% | 15 | 288.15 | 18.07% | 43.87% | 18.07% | 77.76 |
| 13 | 35.00% | 2.55% | 62.45% | 15 | 288.15 | 12.37% | 40.27% | 12.37% | 136.07 |
| 14 | 27.50% | 0.10% | 72.40% | 15 | 288.15 | 15.22% | 42.07% | 15.22% | 110.65 |

TABLE 2-continued

Composition of the perfluoroalkylalkyl group-containing
poly(meth)acrylates of examples 4 to 20 in % by weight

| Example | HEMA | Fluoromonomer 1 | MMA + Sty + nBA | Tg [° C.] | Tg [K] | Sty | nBA | MMA | OH number calculated [mg KOH/g] |
|---|---|---|---|---|---|---|---|---|---|
| 15 | 27.50% | 5.00% | 67.50% | 15 | 288.15 | 15.22% | 42.07% | 15.22% | 103.42 |
| 16 | 27.50% | 2.55% | 69.95% | 0 | 273.15 | 9.64% | 53.22% | 9.64% | 106.92 |
| 17 | 27.50% | 2.55% | 69.95% | 30 | 303.15 | 20.24% | 32.02% | 20.24% | 106.92 |
| 18 | 27.50% | 2.55% | 69.95% | 15 | 288.15 | 15.22% | 42.07% | 15.22% | 106.92 |
| 19 | 27.50% | 2.55% | 69.95% | 15 | 288.15 | 15.22% | 42.07% | 15.22% | 106.92 |
| 20 | 27.50% | 2.55% | 69.95% | 15 | 288.15 | 15.22% | 42.07% | 15.22% | 106.92 |

TABLE 3

Characteristics of the perfluoroalkylalkyl group-
containing poly(meth)acrylates of examples 4 to 20

| Example | SC 160° C. | Mw [g/mol] | Mn [g/mol] |
|---|---|---|---|
| 4 | 53.66 | 13879 | 5637 |
| 5 | 50.78 | 15294 | 6675 |
| 6 | 53.02 | 13776 | 5680 |
| 7 | 51.83 | 16606 | 7026 |
| 8 | 52.55 | 13538 | 6137 |
| 9 | 53.63 | 14491 | 6671 |
| 10 | 55.43 | 13207 | 5668 |
| 11 | 55.54 | 15933 | 7027 |
| 12 | 52.62 | 13817 | 5896 |
| 13 | 52.36 | 14957 | 6733 |
| 14 | 52.52 | 16101 | 6901 |
| 15 | 53.22 | 15494 | 6357 |
| 16 | 52.31 | 14495 | 6412 |
| 17 | 52.79 | 15881 | 6863 |
| 18 | 52.22 | 15138 | 6659 |
| 19 | 51.31 | 15109 | 6567 |
| 20 | 50.17 | 14961 | 6553 |

SC = solids content: 1 g of the substance under measurement is mixed with 1 g of butyl acetate on a support (metal lid) and dried in a forced-air oven at 130° C. for 60 minutes.
Mw = weight-average molecular weight, measured by gel permeation chromatography (GPC) against a polystyrene standard
Mn = number-average molecular weight, measured by gel permeation chromatography (GPC) against a polystyrene standard Preparation of the Coating Materials of Examples 4 to 20

Clearcoat materials are subsequently formulated from the polyacrylate solutions obtained as above. This is done by first dissolving 1.762 parts of benzoic acid, with stirring, in the amount of acrylate resin solution indicated in table 4. Subsequently, the amount of methyl isobutyl ketone indicated in table 4, 0.132 part of a 10% strength solution of dibutyltin dilaurate in butyl acetate, 0.881 part of a commercial light stabilizer mixture consisting of UV and HALS light stabilizers (1:1), and 0.0655 part of a flow control agent based on fluorine-containing acrylates are mixed with stirring. Following addition of a low-viscosity polyisocyanate curing agent based on trimerized hexamethylene diisocyanate (HDI) containing isocyanurate groups, with an isocyanate content of 23.4% based on the solvent-free trimerized hexamethylene diisocyanate (Desmodur® N3600 from BAYER), in an amount (amount indicated in table 4) such that the OH/NCO stoichiometry is 1:1.1, the films are drawn down onto glass panels (wet film thickness of approximately 100 μm). After being left to evaporate for around 30 minutes, the films are then dried at 60° C. for 30 minutes. The contact angles were measured on these films after drying at 130° C. for 30 minutes.

TABLE 4

Composition of the coating materials based on
the perfluoroalkylalkyl group-containing
poly(meth)acrylates of examples 4 to 20, in parts by weight

| Ex. | Polymer | MiBK | Curing agent | DBTL (10% strength) | Tinuvin® 5941-R*1) | Byk 325*2) | Benzoic acid solution | Total |
|---|---|---|---|---|---|---|---|---|
| 4 | 26.88 | 0.00 | 8.047 | 0.132 | 0.881 | 0.062 | 1.762 | 37.76 |
| 5 | 22.39 | 0.00 | 11.101 | 0.132 | 0.881 | 0.062 | 1.762 | 36.33 |
| 6 | 27.85 | 0.00 | 7.702 | 0.132 | 0.881 | 0.062 | 1.762 | 38.39 |
| 7 | 22.67 | 0.10 | 10.722 | 0.132 | 0.881 | 0.062 | 1.762 | 36.32 |
| 8 | 27.45 | 0.00 | 8.047 | 0.132 | 0.881 | 0.062 | 1.762 | 38.33 |
| 9 | 21.20 | 1.18 | 11.101 | 0.132 | 0.881 | 0.062 | 1.762 | 36.32 |
| 10 | 26.64 | 0.00 | 7.702 | 0.132 | 0.881 | 0.062 | 1.762 | 37.18 |
| 11 | 21.15 | 1.61 | 10.722 | 0.132 | 0.881 | 0.062 | 1.762 | 36.32 |
| 12 | 27.74 | 0.00 | 7.871 | 0.132 | 0.881 | 0.062 | 1.762 | 38.45 |
| 13 | 22.08 | 0.50 | 10.908 | 0.132 | 0.881 | 0.062 | 1.762 | 36.32 |
| 14 | 24.21 | 0.00 | 9.755 | 0.132 | 0.881 | 0.062 | 1.762 | 36.80 |
| 15 | 24.59 | 0.00 | 9.384 | 0.132 | 0.881 | 0.062 | 1.762 | 36.81 |
| 16 | 24.67 | 0.00 | 9.566 | 0.132 | 0.881 | 0.062 | 1.762 | 37.07 |
| 17 | 24.44 | 0.00 | 9.566 | 0.132 | 0.881 | 0.062 | 1.762 | 36.85 |
| 18 | 24.71 | 0.00 | 9.566 | 0.132 | 0.881 | 0.062 | 1.762 | 37.11 |
| 19 | 25.15 | 0.00 | 9.566 | 0.132 | 0.881 | 0.062 | 1.762 | 37.55 |
| 20 | 25.72 | 0.00 | 9.566 | 0.132 | 0.881 | 0.062 | 1.762 | 38.12 |

Benzoic acid solution = 25% in MIBK
*1)= commercial light stabilizer mixture from BASF SE
*2)= commercial flow control agent from Byk Chemie GmbH, based on a polyether-modified methylalkyl-polysiloxane

TABLE 5

Results of the determination of the contact angles against water for the coatings of examples 4 to 20

| Example | Measurement 1 [°] | Measurement 2 [°] | Measurement 3 [°] | Average [°] | Standard deviation [%] |
|---|---|---|---|---|---|
| 4 | 73.7 | 70.9 | 75.8 | 73.5 | 2.46 |
| 5 | 72.7 | 72.3 | 71.4 | 72.1 | 0.67 |
| 6 | 117.8 | 117.9 | 117.5 | 117.7 | 0.21 |
| 7 | 115.2 | 113.3 | 116.1 | 114.9 | 1.43 |
| 8 | 71 | 69.2 | 68.7 | 69.6 | 1.21 |
| 9 | 67.8 | 70.4 | 66.5 | 68.2 | 1.99 |
| 10 | 113.2 | 110.5 | 114.9 | 112.9 | 2.22 |
| 11 | 112.1 | 111.3 | 112 | 111.8 | 0.44 |
| 12 | 110.6 | 109.3 | 107.7 | 109.2 | 1.45 |
| 13 | 108.7 | 109 | 109.2 | 109.0 | 0.25 |
| 14 | 66.2 | 68.2 | 66 | 66.8 | 1.22 |
| 15 | 109.6 | 108.2 | 107.7 | 108.5 | 0.98 |
| 16 | 104.2 | 103.1 | 102.8 | 103.4 | 0.74 |
| 17 | 106 | 104.2 | 104.8 | 105.0 | 0.92 |
| 18 | 105.9 | 106.6 | 104.6 | 105.7 | 1.01 |
| 19 | 100 | 103.4 | 103.2 | 102.2 | 1.91 |
| 20 | 103.6 | 104.3 | 103.9 | 103.9 | 0.35 |

Furthermore, the Fischer Scope hardnesses of the coatings of examples 4 to 20 were ascertained. The test took place in accordance with the Vickers Hardness HV method, using the HP100VP X-Prog instrument from Helmut Fischer GmbH (penetration method for hardness testing DIN 50133, hardness measurement method). In this test, a pyramid-shaped diamond is pressed with a defined force increase into a sample. The parameters used are as follows:

Test force increase 1 mN/s
Wait of 15 s (creep)
Test force lowering 1 mN/s
Wait of 15 s at 0 mN Force increase time: the force is raised to 20 mN for 20 seconds. Displacement is measured throughout the time. Parameters including the hardness can be calculated from the force/displacement curve:

HU Universal hardness in $N/mm^2$ at maximum testing force. A shape correction performed is not taken into account. In order to take the shape correction into account, switch on control field corr.

Y Elastic penetration modulus in GPa (MPa). The shape correction is taken into account in all cases.

We/Wtot Elastic deformation component (hHU) in %. Ratio of elastic deformation energy (We) to total deformation energy Wtot Plastic and elastic components of the penetration energy. The shape correction is taken into account in all cases.

Cr 1 Creep under load in %. Behavior of material under constant maximum testing force. The shape correction is taken into account in all cases.

Cr 2 Creep under load in %. Behavior of material under constant (predetermined) minimum testing force following force reduction. The shape correction is taken into account in all cases.

hmax Penetration depth in μm (nm) of the indentor under maximum testing force. A shape correction performed is not taken into account. To take the shape correction into account, switch on control field corr. corr. When the control field is switched on, the parameters of HU, HU(h), HU(F), HU Cr, h(F), and hmax are corrected for the real shape of the indentor. The shape correction performed is taken into account in each case.

TABLE 6

Results of the Fischer Scope surface hardness measurement of the coating materials of examples 4 to 20

| Sample | HU k [N/mm²] | Y [GPa] | We/Wtot [%] | Cr 1 [%] | Cr 2 [%] | hmax k [μm] |
|---|---|---|---|---|---|---|
| 4 | 32.7 | 2.07 | 15.6 | 20.5 | −11.6 | 4.80 |
| 5 | 94.1 | 2.50 | 36.6 | 10.9 | −14.2 | 2.83 |
| 6 | 26.2 | 2.21 | 13.2 | 24.3 | −11.9 | 5.36 |
| 7 | 91.4 | 2.48 | 35.4 | 11.3 | −14.1 | 2.87 |
| 8 | 114.8 | 3.06 | 36.5 | 10.0 | −12.5 | 2.56 |
| 9 | 126.1 | 3.22 | 40.1 | 8.4 | −12.8 | 2.45 |
| 10 | 112.1 | 3.05 | 36.0 | 10.0 | −12.7 | 2.59 |
| 11 | 71.7 | 2.41 | 26.9 | 14.9 | −11.8 | 3.24 |
| 12 | 124.5 | 3.18 | 39.8 | 8.5 | −13.0 | 2.46 |
| 13 | 110.8 | 2.86 | 38.8 | 9.5 | −13.7 | 2.61 |
| 14 | 102.0 | 2.78 | 35.7 | 10.8 | −13.2 | 2.72 |
| 15 | 107.1 | 2.87 | 36.9 | 10.2 | −13.4 | 2.65 |
| 16 | 61.7 | 2.10 | 26.8 | 15.6 | −13.3 | 3.50 |
| 17 | 120.0 | 3.17 | 37.8 | 9.2 | −12.7 | 2.51 |
| 18 | 99.3 | 2.69 | 35.7 | 10.9 | −13.4 | 2.76 |
| 19 | 103.0 | 2.78 | 36.2 | 10.5 | −13.5 | 2.71 |
| 20 | 99.3 | 2.76 | 34.9 | 10.9 | −13.5 | 2.76 |

Examples 21 to 23

The results obtained by the statistical experimental plan were tested for their scale-up capacity in a selection of formulas. For this purpose (corresponding to table 7) the following polyacrylates were produced on a pilot scale. The formulas here were tested with a low fluoromonomer content and a low total Tg (example 21);

a high fluorine content with a low Tg (example 22); and a high fluorine content with a high Tg and relatively high OH number (example 23).

All of the resins were clear and showed no gel particles. The formula of example 23 was then formulated into a clearcoat material, for the purpose of them testing the adhesion.

Polyacrylate Resins of Examples 21 to 23

A 4 l stainless steel reactor, temperature-conditioned via an oil-heated stainless steel jacket, and equipped with an anchor stirrer, reflux condenser, and thermometer, is charged with the amount of methyl isobutyl ketone (MIBK) listed as initial charge in table 7. Under nitrogen blanketing, the reactor is heated to 110° C. Membrane pumps are then used to meter 1200 g of the respective monomer mixture over 4 hours. In parallel, with a preliminary run time of 10 minutes and with a total feed time of 4.75 hours, again using a membrane pump, a 50% strength solution of tert-butyl per-2-ethylhexanoate (TBPEH) in methyl isobutyl ketone (MIBK) is metered in. After a further 60 minutes at 110° C., the batch is cooled.

TABLE 7

Composition of the polyacrylates of examples 21 to 23 in parts by weight and calculated OH numbers of the polyacrylates

| | OH number [mg KOH/g] (calculated) | Initial charge MIBK | Monomer mixture | | | | | Initiator feed | |
|---|---|---|---|---|---|---|---|---|---|
| | | | HEMA* | Fluoromonomer 1 | Styrene | MMA* | nBA* | TBPEH | MIBK |
| Acrylate Example 21 | 150 | 1200 | 239.76 | 1.2 | 149.76 | 149.76 | 659.52 | 25.2 | 25.2 |
| Acrylate Example 22 | 90 | 1200 | 234 | 29.76 | 211.44 | 211.44 | 513.36 | 25.2 | 25.2 |
| Acrylate Example 23 | 150 | 1200 | 409 | 29.84 | 144.7 | 144.7 | 471.2 | 25.2 | 25.2 |

*MMA = Methyl methacrylate; nBA = n-Butyl acrylate, HEMA = Hydroxyethyl methacrylate Preparation of the Clearcoat Materials and Production of the Resultant Coatings of Examples 21 to 23

Clearcoat materials are subsequently formulated from the polyacrylate solutions obtained as above. For this purpose, 50 parts in each case of acrylate resin solution are admixed with 0.03 part of dibutyltin dilaurate, 2 parts of a commercial light stabilizer mixture consisting of UV and HALS light stabilizers (1:1), 0.15 part of a flow control agent based on fluorine-containing acrylates, and 1 part of benzoic acid, with stirring. Following addition of a low-viscosity polyisocyanate curing agent based on trimerized hexamethylene diisocyanate (HDI) containing isocyanurate groups, with an isocyanate content of 23.4%, based on the solvent-free trimerized hexamethylene diisocyanate (Desmodur® N3600 from BAYER), in an amount such that the OH/NCO stoichiometry is 1:1.1, the films are drawn down onto glass panels (wet film thickness of approximately 100 µm). The films are left to evaporate for about 30 minutes and then dried at 60° C. for 30 minutes.

Contact Angle Measurement:

To determine the hydrophobicity of the coating, one drop of water is applied to the surface under investigation of the cured coating. Then, under the microscope, a measurement is made of the contact angle (H), by determining the tangent at the point of contact between the water drop and the coating surface, as described above, by means of the Mobiledrop mobile contact angle measuring system from Krüss.

The results of the coatings of examples 21 to 23 are set out in table 8. The smaller this contact angle, the better the wetting of the surface. For the inventive coatings, desirable contact angles, measured against water, are at least 65°, more particularly at least 90°.

TABLE 8

Result of contact angle measurement

| Coating | Contact angle H₂O |
|---|---|
| Coating example 21 Coating based on acrylate example 21, OHN about 150 mg KOH/g | 69.6° |
| Coating example 22 Coating based on acrylate example 22, OHN about 90 mg KOH/g | 107.8° |

TABLE 8-continued

Result of contact angle measurement

| Coating | Contact angle H₂O |
|---|---|
| Coating example 23 Coating based on acrylate example 23, OHN about 150 mg KOH/g | 102.7° |

Determination of Recoatability:

For this purpose, a cathodically electrocoated metal panel (approximately 50×50 cm) is coated with an aqueous, pure black refinish basecoat material from Glasurit Reihe 90 [90 series] in a film thickness of 10-15 µm, and the applied basecoat is flashed off in accordance with the technical information bulletin for Glasurit® RATIO Aqua, Alternative Glasurit® primer-surfacer 285-700/-730/790 from Glasurit. Then accordingly, the inventive clearcoat material of example 23 is applied in a film thickness of 40-60µ by pneumatic spray application. Following flash-off at room temperature for approximately 15 minutes, the clearcoat material is dried in a laboratory drying oven at 60° C. for 30 minutes.

After the panels have been stored at room temperature for 7 days, the unsanded clearcoat is then applied in turn with the aqueous, black refinish basecoat material from the Glasurit 90 series, but now in a tapering wedge with a coat thickness from 20 µm to 0 µm. Flashing off is repeated, after which the above clearcoat material of example 23 is likewise applied in a wedge, but with this clearcoat wedge then rotated by 90° relative to the basecoat wedge. After baking in an oven at 60° C. for 30 minutes, and after cooling, the adhesion is tested by the cross-cut method.

For the clearcoat material of example 23, very good adhesion was found over the whole area. This showed that adhesion was outstanding not only for the unmodified basecoat to the clearcoat of the invention but also for the clearcoat material to itself.

The invention claimed is:

1. A nonaqueous coating material composition comprising:
   (A) 30% to 80% by weight of a (per)fluoroalkyl group-containing poly(meth)acrylate component (A), wherein the poly(meth)acrylate component (A) contains multiple hydroxyl groups, (B) 20% to 70% by weight of one or more polyisocyanate compounds (B), and (D) one or more catalysts (D), the weight percentages of components (A) and (B) being based in each case on the binder content of components (A) and (B), and the sum of the weight fractions of components (A) plus (B) being in each case 100% by weight, wherein the poly(meth)acrylate component (A) comprises as a synthesis component 0.05% to 15.0% by weight, based in each case on the amount of all of the compounds used in preparing the poly(meth)acrylate component (A), of one or more (per)fluoroalkyl group-containing reaction products (U) of:

(i) one or more diisocyanates (PI) having two isocyanate groups with different reactivities, (ii) one or more (per)fluoroalkyl monoalcohol components (FA), and (iii) optionally one or more compounds (V) having at least one group (G1) that is reactive toward isocyanate groups, and optionally having a further functional group (G2), which is different from group (G1).

2. The coating material composition of claim 1, wherein the one or more (per)fluoroalkyl monoalcohol components (FA) have the general formula (I):

and/or of the general formula (II):

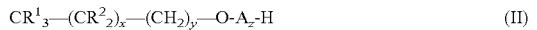

in which $R^1$ and $R^2$ independently of one another are H, F, or $CF_3$, but $R^1$ and $R^2$ must not simultaneously be H, x is 1-20, y is 1-6, and z is 0-100, A is $CR'R''$—$CR'''R''''$—O or $(CR'R'')_a$—O or CO—$(CR'R'')_b$—O, R', R'', R''', and R'''' are independently of one another H, alkyl, cycloalkyl, aryl, or any organic radical having 1 to 25 C atoms, a and b are each 3-5, and $A_z$ is a homopolymer, copolymer or block polymer of any A.

3. The coating material composition of claim 1, wherein the one or more (per)fluoroalkyl monoalcohol components (FA) have the general formula:

and/or

in which l is 1-8, m is 1 to 15, n is 1 to 12, and o is 1 to 10.

4. The coating material composition of claim 1, wherein the poly(meth)acrylate component (A) comprises 0.1% to 10.0% by weight, based in each case on the amount of all of the compounds used in preparing the poly(meth)acrylate component (A), of the one or more (per)fluoroalkyl-containing reaction products (U).

5. The coating material composition of claim 1, wherein the poly(meth)acrylate component (A) comprises, as the synthesis component, the (per)fluoroalkyl group-containing reaction product (U) of:

(i) one or more diisocyanates (PI) having two isocyanate groups with different reactivities, (ii) one or more (per)fluoroalkyl monoalcohol components (FA), and (iii) one or more compounds (V) having a group (G1) that is reactive toward isocyanate groups, and having an ethylenically unsaturated double bond (G2).

6. The coating material composition of claim 1, wherein the poly(meth)acrylate component (A) comprises, as the synthesis component, the (per)fluoroalkyl group-containing reaction product (U) of:

(i) one or more aliphatic and/or cycloaliphatic diisocyanates (PI) having two isocyanate groups with different reactivities, (ii) one or more (per)fluoroalkyl monoalcohol components (FA)

in which r is 1 to 8, and p is 1 to 6, (iii) one or more compounds (V) having at least one of a carboxyl group and a hydroxyl group (G1), and having at least one of an acrylically unsaturated double bone and a methacrylically unsaturated double bond (G2).

7. The coating material composition of claim 1, wherein the poly(meth)acrylate component (A) consists of one or more saturated (per)fluoroalkyl group-containing polyacrylates, wherein the polyacrylates contain multiple hydroxyl groups; or one or more saturated (per)fluoroalkyl group-containing polymethacrylates, wherein the polymethacrylates contain multiple hydroxyl groups; or a mixture of one or more saturated (per)fluoroalkyl group-containing polyacrylates and one or more saturated (per)fluoroalkyl group-containing polymethacrylates, wherein the polyacrylates and polymethacrylates contain multiple hydroxyl groups.

8. The coating material composition of claim 1, wherein the poly(meth)acrylate component (A) comprises, as the synthesis component, the (per)fluoroalkyl group-containing reaction product (U) of:

(i) 1 mol of one or more diisocyanates (PI) having two isocyanate groups with different reactivities, (ii) 1 mol of one or more (per)fluoroalkyl monoalcohol components (FA), and (iii) 1 mol of one or more ethylenically unsaturated compounds (V) having a group (G1) that is reactive toward isocyanate groups.

9. The coating material composition of claim 1, wherein the poly(meth)acrylate component (A) is saturated and synthesized from:

(a1) 0.05% to 15.0% by weight of one or more (per)fluoroalkyl group-containing, ethylenically unsaturated reaction products (U), (a2) 10% to 50% by weight of one or more hydroxyl group-containing monomers, (a3) 10% to 89.95% by weight of one or more alkyl and/or cycloalkyl esters of ethylenically unsaturated carboxylic acids, (a4) 0% to 50% by weight of one or more vinylaromatic compounds, and (a5) 0% to 10% by weight of further ethylenically unsaturated monomers, the sum of the weight fractions of the monomers (a1) to (a5) being in each case 100% by weight.

10. The coating material composition of claim 1, wherein the poly(meth)acrylate component (A) has an OH number of 60 to 300 mg KOH/g.

11. The coating material composition of claim 1, wherein the poly(meth)acrylate component (A) has a glass transition temperature of −100° C. to +100° C.

12. The coating material composition of claim 1, wherein the coating material composition further comprises 0.2% to 15.0% by weight, based in each case on the binder fraction of the sum of the components (A) plus (B), of at least one aromatic carboxylic acid (S) whose carboxyl group is in conjugation with a π-electron system.

13. The coating material composition of claim 1, wherein the poly(meth)acrylate component (A) comprises as synthesis component the (per)fluoroalkyl group-containing reaction product (U) of
   (i) isophorone diisocyanate,
   (ii) 2-(perfluorohexyl)ethanol, and
   (iii) hydroxyethyl acrylate, hydroxyethyl methacrylate, hydroxyalkylcaprolactone acrylate, and/or hydroxyalkylcaprolactone methacrylate.

14. A method of coating comprising: applying to an optionally precoated substrate a layer of the coating material composition of claim 1.

15. The method of coating of claim 14, wherein the coating material composition, after being applied, is cured at temperatures between 20 and 80° C.

16. The method of coating of claim 14, wherein the optionally precoated substrate is an aircraft or a wind energy system, or one or more parts thereof.

17. The method of coating of claim 14, wherein the coating material composition is applied as an outermost coating film to rotor blades of wind energy systems.

18. The method of coating according to claim 14, wherein a coating formed from the coating material composition is effective as a permanent water-repellent and soiling-repellent surface coating.

19. The method of coating according to claim 14, wherein a coating formed from the coating material composition is effective as an anti-icing coating of aircraft or wind energy systems, or parts thereof.

20. The method of coating according to claim 14, wherein a coating formed from the coating material composition is effective as a coating of aircraft or of rotor blades of wind energy systems for reducing the noise generated by movement thereof.

21. A wind energy system or one or more parts of a wind energy system having a paint system, optionally a multicoat paint system, wherein a topmost coating film has been produced from the coating material composition according to claim 1.

* * * * *